June 12, 1962     M. B. RASMUSSON     3,038,635
STICK INSERTER FOR FROZEN CONFECTION MACHINES
Filed March 20, 1959     2 Sheets-Sheet 1
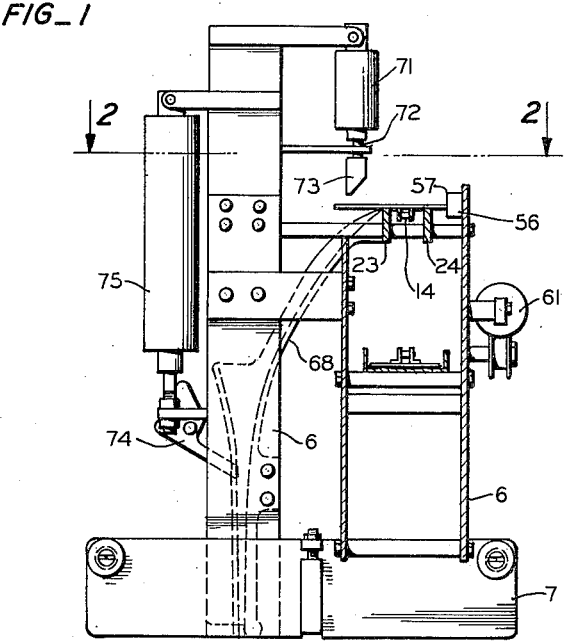
FIG_1
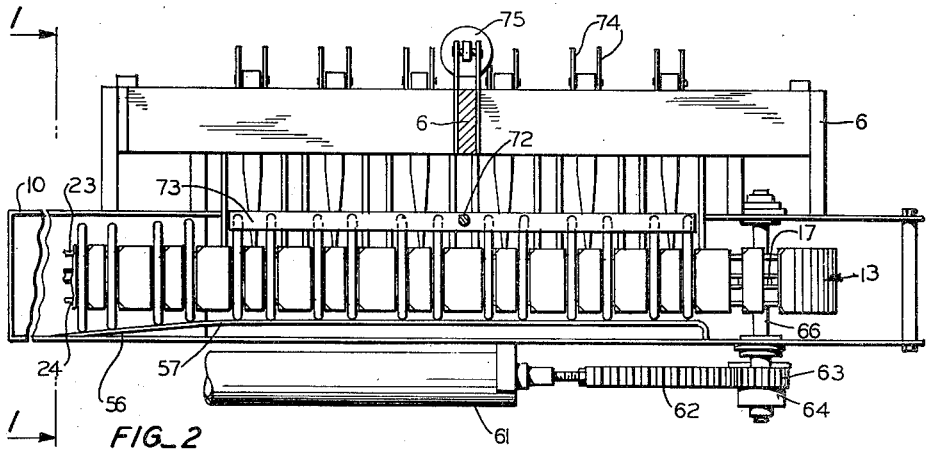
FIG_2
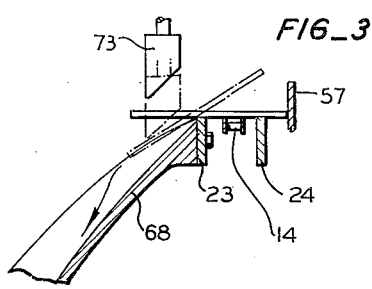
FIG_3
INVENTOR.
MARLIN B. RASMUSSON
BY *Lothrop & West*
ATTORNEYS June 12, 1962 M. B. RASMUSSON 3,038,635
STICK INSERTER FOR FROZEN CONFECTION MACHINES
Filed March 20, 1959 2 Sheets-Sheet 2
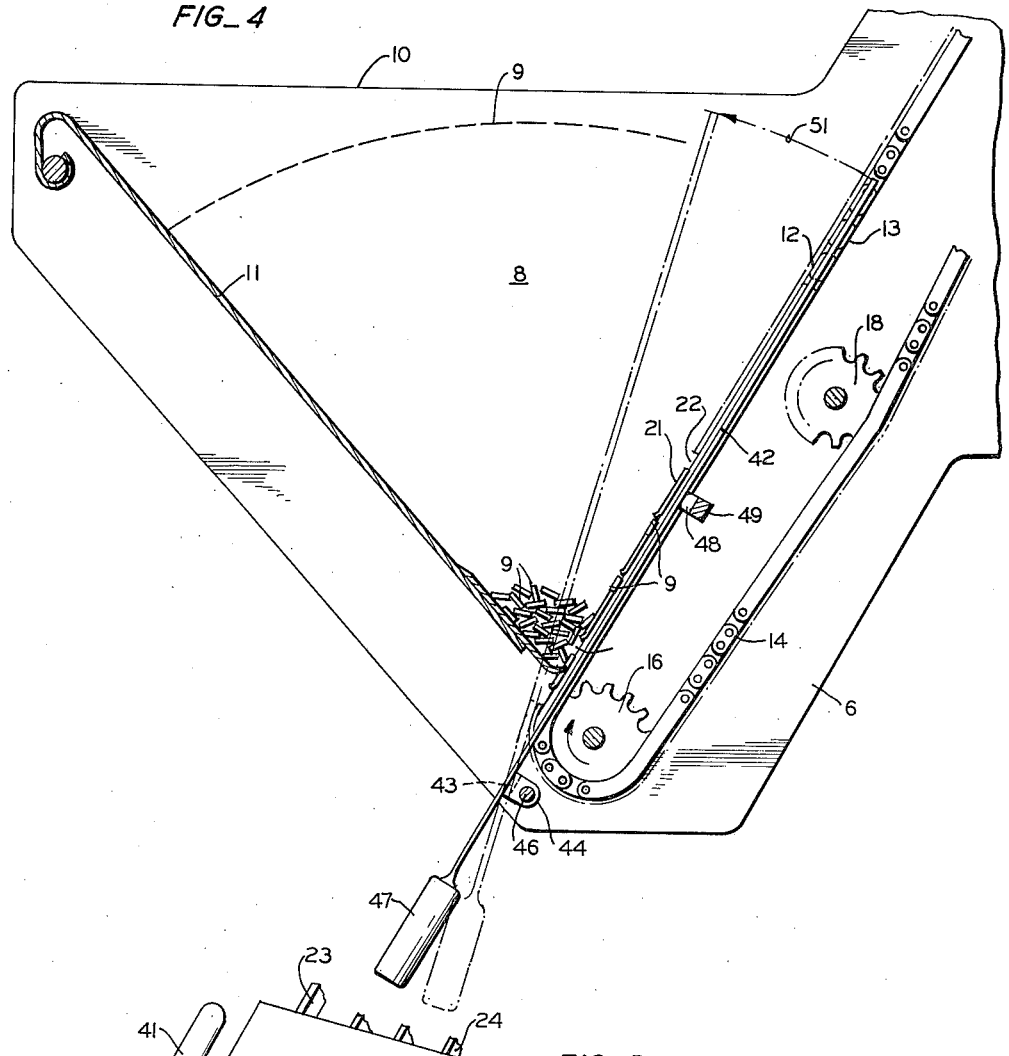
FIG_4
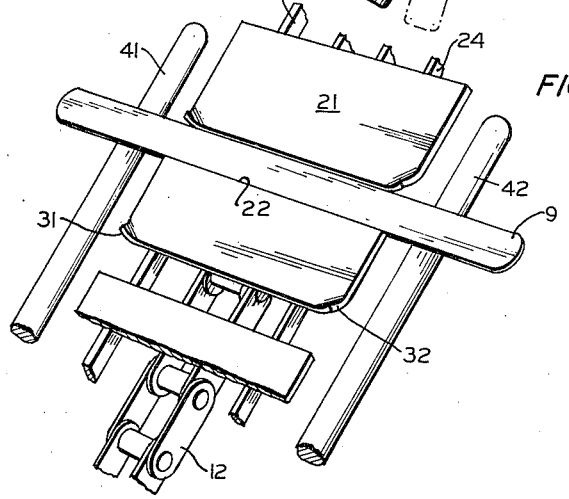
FIG_5
INVENTOR.
MARLIN B. RASMUSSON
BY
*Lothrop & West*
ATTORNEYS

United States Patent Office 3,038,635
Patented June 12, 1962

3,038,635
STICK INSERTER FOR FROZEN CONFECTION MACHINES
Marlin B. Rasmusson, 6601 Elvas Ave., Sacramento, Calif.
Filed Mar. 20, 1959, Ser. No. 800,671
4 Claims. (Cl. 221—81)

My invention relates to a mechanism particularly adapted for use in connection with a continuously acting machine for producing confections comprising a block of frozen milk or water ice mix in which a handle in the form of a wooden or comparable stick is disposed. A device of this sort is shown in my copending application entitled "Frozen Confection Machine Stick Inserter," filed December 1, 1958, with Serial No. 777,518, now Patent No. 2,953,105, dated September 20, 1960.

The function of a stick inserter as disclosed in the accompanying application is to take uniformly fashioned wooden sticks received either in bundled packages or in bulk and to arrange such sticks in a sequential order and deliver them to a station for insertion of the sticks into a partially frozen block of confection, In connection with such mechanisms, there has been some difficulty encountered in insuring that the sticks when handled in bulk are suitably separated, arranged and located in connection with the mechanism which carries them to the station for insertion. Additionally, in some instances it has been found desirable to hold up the insertion of sticks temporarily. This may be due to the temporary manufacture of confections not requiring inserted sticks, may be due to changes in operation of other parts of the machine or may be for other reasons. Furthermore, some of the available mechanisms for handling the sticks prior to their insertion into the partly frozen confections have not always operated to the desired standards.

It is therefore an object of my invention to provide in general a stick inserter for frozen confection machines which overcomes some of the problems previously occurring and provides a substantially improved result.

Another object of the invention is to provide a means for precluding jamming and malpositioning of sticks, particularly as they are being retrieved from a hopper.

Another object of the invention is to provide means for temporarily interrupting the feeding of sticks in a stick inserting machine.

Another object of the invention is to provide an improved mechanism for handling sticks destined for insertion into partially frozen confections.

Other objects, together with the foregoing, are attained in the embodiment of the invention described in the accompanying description and shown in the accompanying drawings, in which:

FIGURE 1 is, for the most part, a side elevation of a stick inserter for frozen confection machines and, except as otherwise appears herein, is of the sort disclosed in my above identified application. In FIGURE 1, a portion of the structure is shown in cross-section on a longitudinal, vertical plane, as shown by the line 1—1 of FIGURE 2.

FIGURE 2 is a horizontal cross-section of the device shown in FIGURE 1, the plane of section being indicated by the line 2—2 in that figure.

FIGURE 3 is a cross-sectional detail on a longitudinal, vertical plane through the central portion of one of the chute mechanisms and its attendant structure.

FIGURE 4 is an enlarged cross-section on a vertical, transverse plane, especially showing the hopper and attendant mechanism.

FIGURE 5 is a fragmentary view in perspective of part of the conveyor mechanism adjacent the bottom portion of the hopper.

The stick inserter has been embodied in commercial devices, particularly in devices having a horizontally travelling chain conveyor carrying a plurality of open top metal molds through the upper portion of a brine tank. The molds are partially filled with liquid to be frozen and at some stage in the advancement of the molds wherein the contents are partly frozen, wooden sticks are inserted into the confection. In the usual case, the molds progress through the brine tank in groups of six molds arranged across the direction of advance. The sticks which are employed are customarily wooden sticks, straight, flat, rounded at the ends, and have generally rectangular edges.

In the present device, there is provided a frame 6 mounted on a base 7 designed to be secured on a confection making machine of the indicated sort. On the frame 6 at one end thereof there is provided a hopper 8 for the reception of a plurality of sticks 9. These sticks are dumped into the hopper in bulk, usually with all of the sticks arranged in the same direction or extending substantially parallel to each other, but bearing no other, regular relationship to each other.

To confine the sticks appropriately, the hopper 8 is in part defined by side walls 10 and an inclined bottom wall 11 extending between the side walls and appropriately supported thereon. The remaining boundary of the hopper is formed by an inclined run 12 of a chain conveyor generally designated 13. This comprises a link chain 14 appropriately trained over appropriate sprockets 16 and 17 and at intervals provided with idlers 18.

The conveyor includes on certain links of the chain 14 a plurality of transversely extending slats 21. These are secured to the chain and are spaced apart just sufficiently to afford slots 22 between adjacent slats of substantially the same cross-sectional configuration as the sticks to be handled. The slats 21 not only are secured to the chain 14 but are also for a portion of their travel slidably supported on fixed rails 23 and 24. These maintain the slats in appropriate, substantially planar position.

The inclined run 12 of the conveyor 13 forms one side of the V-shaped or trough-like hopper 8. The inclination is relatively steep, at least steep enough so that the conveyor is borne against by the miscellaneously arranged, plurality of loose sticks within the hopper 8. From time to time, one of the sticks is in position to be engaged by one of the slats 21 and to occupy a slot 22 between successive slats. An engaged stick occupies the slot completely and projects evenly from both sides of the slats while being supported on the subjacent rails 23 and 24. It is found in practice that from time to time more than one stick will become partially lodged or caught in a single slot. The multiple engaged sticks will inter-engage with others in the hopper and may result in the complete dislodgement of a stick from a particular slot or in the malpositioning of a stick.

Pursuant to my invention, I have determined that if each of the slats 21, instead of being made entirely planar and rectangular, is, as particularly shown in FIGURE 5, provided on its trailing, outermost corners with upturned, trailing tips 31 and 32 and if the conveyor run 12 is inclined sufficiently so that sticks cannot merely rest thereon and be lifted solely by friction, then substantially all of the difficulty is overcome. The sticks tend to lodge well in their respective slots 22 as the railing, upturned corners 31 and 32 tend to lift the miscellaneous bulk sticks in the hopper slightly to permit the stick in the next adjacent or following slot to ride easily under the superposed, bulk sticks.

If any excess sticks tend to ride up with the conveyor, they not only slip back by gravity but are then deflected upwardly by the tips 31 and 32 and out of disturbing contact with the properly lodged sticks. With this arrangement, it has been found in protracted experience that the slots 22 are nearly always properly and uniquely filled and that the travelling sticks are not deleteriously entangled or engaged with the superposed ones and that excess sticks are not carried out of the hopper 8.

It is sometimes desired temporarily to interrupt the feeding of sticks to the conveyor 13 without actually stopping the conveyor itself. That is accomplished, pursuant to the present invention, by the provision of a pair of rods 41 and 42 joined intermediate their ends by a cross-strap 43 having downturned lugs 44. A cross-shaft 46 mounted in the walls 10 of the hopper 8 engages the lugs 44 and supports the strap 43 so that the rods 41 and 42 can be pivoted in unison about the shaft 46. A handle 47 is disposed at the end of each rod for convenient manipulation.

Normally, the two rods 41 and 42 lie by gravity against stops 48 on a bar 49 spanning the walls 10 of the hopper. In this position, the rods 41 and 42 are alongside of the inclined run 12 of the chain and are disposed beneath the projecting portions of the sticks disposed in the chain slots. When the operator depresses one or both of the handles 47, he rotates both rods 41 and 42 in an anti-clockwise direction, as shown by the arrow 51 in FIGURE 4, and lifts the sticks already engaged in the chain out of their slots and also lifts and holds off of the chain the remaining bulk sticks within the hopper 8. When stick feeding is to be resumed, the handles 47 are lifted, the rods 41 and 42 are restored to their initial lower position against the stops 48 and the rods no longer interfere with the loading of the chain slots.

As the conveyor 13 advances the successive sticks engaged in the slots of the chain, the sticks travel from the top of the inclined portion 12 onto a horizontal run, as shown in FIGURES 1 and 2, toward a discharge station or portion. This station or portion is substantially the central part of the mechanism as illustrated in FIGURE 2. In approaching the discharge station or portion, the sticks are originally disposed substantially symmetrically on the conveyor 13 as they are substantially so confined by the side walls 10 of the hopper. As they continue to advance in the horizontal top run of the conveyor, the sticks are transversely displaced by the inclined portion 56 of a cam rail 57. As the sticks traverse the mechanism from the left side of FIGURE 2 toward the right side thereof they are shifted transversely of the conveyor and are guided in the transverse, shifted position by the straight or parallel portion of the cam rail 57. The top run of the conveyor in its advance supplies the requisite number of sticks at the discharge station or portion. In the present instance, there is provision made for six molds and the confection in each mold is a twin and requires two sticks.

Preferably, the conveyor is not advanced continuously but is advanced step by step or intermittently. That is accomplished by a pneumatic cylinder 61 operating a rack 62 in engagement with a pinion 63. A one-way clutch is disposed within a housing 64 united with the pinion 63 and engageable with a cross-shaft 66 which carries the sprocket 17 for driving the chain. After a number of actuations of the cylinder 61, a suitable number of sticks are disposed substantially as shown in FIGURES 1 and 2, with the sticks projecting from one side of the chain considerably more than from the other.

At the discharge station, there are arranged across the frame 6 a plurality of discharge chutes 68 extending upwardly to points close to the rail 23. The upper run of the chain stops between its successive advances in a position with each of the unsymmetrically projecting sticks overlying a subjacent one of the chutes 68.

To discharge the properly positioned sticks into their respective chutes, there is mounted on the frame 6 a pneumatic jack 71 having an appropriately guided jack rod 72. This is secured in a beveled discharge bar 73 normally positioned as shown in FIGURE 1 just above the longer projecting ends of the subjacent sticks. This bar is long enough to extend over six pairs of the sticks.

When the conveyor 13 is stationary, the jack 71 is actuated to lower the rod 72 and depress the bar 73. The lowering bar 73 tips the sticks by depressing their projecting ends downwardly into the troughs immediately below. The center of gravity of the sticks is sufficiently shifted so that the sticks fall itno the chutes and slide into the vertical, lower portions of the chutes. The vertical sticks are periodically expelled by stick engaging fingers 74 actuated by a common pneumatic jack 75. The jack 71 is reversed to restore the bar 73 to its uppermost position, and the cylinder 61 is again actuated to repeat the cycle.

What is claimed is:

1. A stick inserter for frozen confection machines comprising a frame, a horizontal discharge portion on said frame, a chain conveyor having a horizontal run at said discharge portion, means for advancing said conveyor on said frame in a predetermined direction at said discharge portion, slats on said conveyor extending transversely of said direction and horizontally at said discharge portion, said slats being spaced apart to provide slots of substantially the same cross-section as a stick but substantially shorter than said stick whereby said sticks project at both ends from said conveyor, a plurality of chutes on said frame at said discharge portion and on one side of said conveyor, means on said frame in the path of one projecting end of said sticks for transversely displacing said sticks in said slots toward said chutes as said conveyor advances, and means on said frame and movable against the other end of said sticks when transversely displaced for tipping said sticks from said conveyor to fall into said chutes.

2. A stick inserter for frozen confection machines comprising a frame, a stick hopper on said frame, a horizontal discharge portion on said frame, a chain conveyor, slats on and extending transversely of said conveyor and spaced apart to provide slots, each of said slots being substantially filled by a stick which projects transversely of said conveyor, means mounting said conveyor on said frame to extend through said hopper and through said horizontal discharge portion, means for advancing said conveyor on said frame through said hopper and through said horizontal discharge portion, and a stationary cam rail on said frame adjacent said horizontal discharge portion in the path of the projecting portions of said sticks for transversely displacing said sticks in said slots as said conveyor advances said sticks.

3. A stick inserter for frozen confection machines comprising a frame, a stick hopper on said frame, a chain conveyor, slats secured to and extending transversely of said conveyor, said slats comprising substantially rectangular flat-topped members spaced apart along said conveyor to define shallow slots therebetween of a size to receive a stick from said hopper, means mounting said conveyor on said frame to move through said hopper along an upwardly inclined path, the rear corners of said slats being turned upwardly to define upwardly and rearwardly sloping surfaces at the rear edge thereof whereby to deflect any stick resting on said slat upwardly to prevent engagement thereof with any stick resting in the adjacent slot.

4. A stick inserter for frozen confection machines comprising a frame, a horizontal discharge portion on said frame, a chain conveyor movable along said horizontal discharge portion, means on said conveyor defining longitudinally spaced transverse slots each adapted to receive a stick therein, means for directing sticks longer than said slots into said slots so that at least one end of each stick projects from one side of said conveyor, at least one chute on said frame adjacent said one side of said conveyor at said horizontal discharge portion and having an entrance portion below the projecting ends of said sticks, and means on said frame mounted for downward movement thereon adjacent said one side of said conveyor and toward said chute entrance portion whereby to engage said laterally projecting end of a stick in a slot of said conveyor to tilt said stick off said one side of said conveyor and into said chute.

References Cited in the file of this patent
UNITED STATES PATENTS

| | | |
|---|---|---|
| 1,953,506 | Schnaier | Apr. 3, 1934 |
| 2,138,662 | Neumair | Nov. 27, 1938 |
| 2,656,053 | Bishop | Oct. 20, 1953 |
| 2,734,620 | Fischer et al. | Feb. 14, 1956 |
| 2,762,507 | Searles | Sept. 11, 1956 |
| 2,815,848 | Jones | Dec. 10, 1957 |
| 2,840,269 | Anderson | June 24, 1958 |
| 2,910,165 | Byington | Oct. 27, 1959 |